Feb. 16, 1926. 1,573,583
C. H. SMITH
SPRING SUSPENSION FOR MOTOR VEHICLES
Filed April 2, 1925
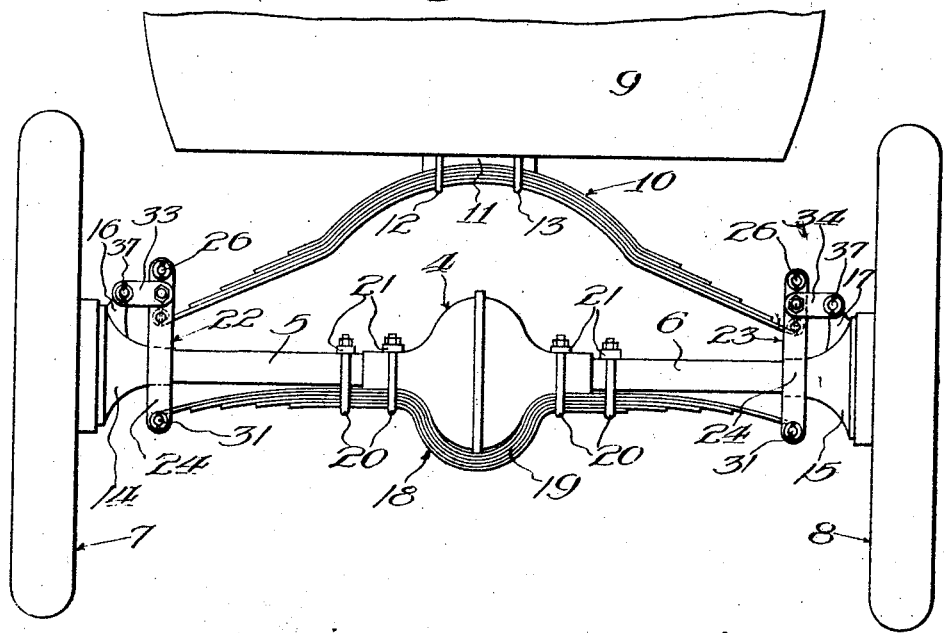
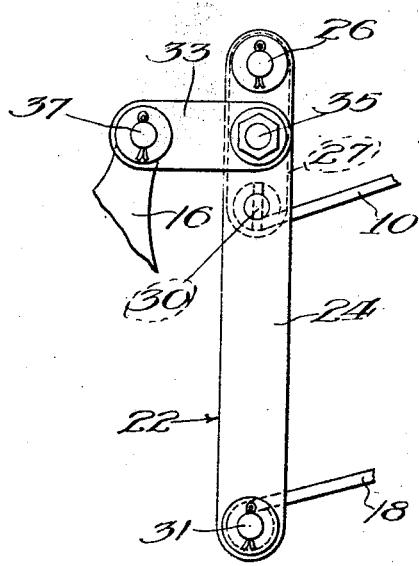 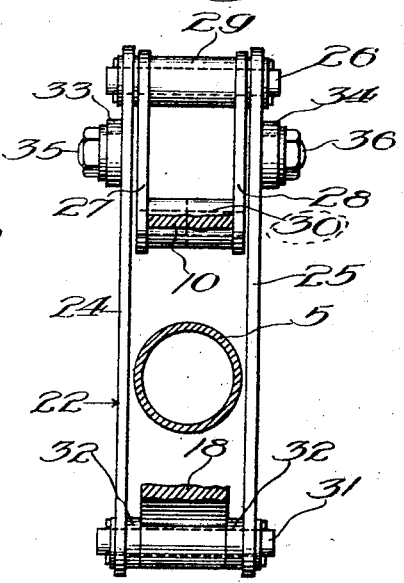
Inventor:
Charles H. Smith,
by [signature]
Attys.

Patented Feb. 16, 1926.

1,573,583

UNITED STATES PATENT OFFICE.

CHARLES H. SMITH, OF AURORA, ILLINOIS, ASSIGNOR OF ONE-HALF TO ALFRED W. MITCHELL, OF JANESVILLE, WISCONSIN.

SPRING SUSPENSION FOR MOTOR VEHICLES.

Application filed April 2, 1925. Serial No. 20,183.

*To all whom it may concern:*

Be it known that I, CHARLES H. SMITH, a citizen of the United States, residing at Aurora, in the county of Kane and State of Illinois, have invented certain new and useful Improvements in Spring Suspensions for Motor Vehicles, of which the following is a specification.

The present invention has to do with improvements in spring suspensions for motor vehicles and the like. The invention has to do with a spring suspension construction in which use is made of a crosswise extending spring such as is found at the rear ends of Fords, and other cars such as Cadillacs, Marmons, etc. The features of the invention are particularly intended for use in connection with Ford cars, but a study of the invention will show that they are not necessarily limited to this or any other particular class of cars.

Furthermore, the construction herein disclosed has been devised with a particular view to meeting the conditions existing at the rear ends of Ford cars, and for this reason, among others, I have chosen to illustrate and will describe the invention as so applied. In so doing, however, it will be understood that the features of the invention may also be used in connection with the front axles of vehicles.

One of the objects of the invention is to provide a double spring suspension in which use is made of a series of spring leaves in addition to the cross leaf spring already in use. In this connection, it is an object of the invention to so arrange this supplemental spring that the flexibility of the combined arrangement will be very much greater than that of the spring usually provided. This will greatly improve the smoothness of the riding qualities of the vehicle.

Another feature of the invention relates to the provision of means for limiting the side sway of the body, such limiting means being provided in conjunction with the double spring arrangement. In connection with the above, it is a feature of the invention to provide the limitation of side sway by a very simple attachment to the shackles which join together the end portions of the two spring members.

Another feature of the invention relates to the provision of means for greatly stiffening and strengthening the differential and axle shaft housing of the machine. In this connection, it is a further object to secure the above result by the use of the supplemental leaf springs which constitute a portion of the present invention.

Another object is to provide an arrangement which shall be very cheap and simple in construction, as well as being rugged and durable and well adapted to meet the severe service which will be imposed upon it.

Other objects and uses of the invention will appear from a detailed description of the same, which consists in the features of construction and combinations of parts hereinafter described and claimed.

In the drawing:

Figure 1 shows a rear elevation of a portion of a Ford chassis having applied thereto the spring suspension of the present invention;

Fig. 2 shows the left hand shackle illustrated in Fig. 1, but on enlarged scale; and Fig. 3 shows a side elevation corresponding to Fig. 2.

In the drawing, the differential housing is designated by the numeral 4 and the two axle shaft housings by the numerals 5 and 6, respectively. The rear wheels are illustrated at 7 and 8, and the lower portion of the body at 9.

The standard type of construction includes a crosswise extending spring 10, the center portion of which is secured to the body or to a cross member of the chassis by the use of a block 11 and clips 12 and 13. The end portions of the axle shaft housings, or else the wheel hubs 14 and 15, are provided with lugs 16 and 17 to which the end portions of the spring 10 are attached in standard practice.

According to the present invention I take another leaf spring, designated in its entirety by the numeral 18, and place the same beneath the differential and axle shaft housings. For this purpose said leaf spring 18 has its leaves so bent in the central portions, as shown at 19, that they curve around beneath the differential housing with their end portions reaching to the two sides and beneath the axle shaft housings 5 and 6. This supplemental spring is held in place by a series of clips 20, and preferably these clips are passed up from beneath, so that the cross plates 21 may set against the top sides of the differential axle shaft housings and the parts secured rigidly together by nuts operated from above.

According to the present invention I place the shackles 22 and 23 at the two sides of the rear ends of the chassis, said shackles joining the ends of the standard spring 10 to the ends of the supplemental spring 18 and to the lugs 16 and 17, respectively. In the construction illustrated each of these shackles includes a pair of side plates 24 and 25 straddling the axle shaft housing, as shown in Figs. 1 and 3. A pin 26 reaches through the upper ends of the side plates, and a pair of hangers 27 and 28 have their upper ends swiveled on the pin 26 at points between the side plates 24 and 25. If desired, a collar 29 may be placed on the pin 26 between the plates 27 and 28 so as to keep them properly spaced.

Another pin 30 is extended between the lower portions of the hangers 27 and 28 and receives the loop on the end of the lower leaf of the standard spring 10. This is clearly evident from the different figures.

A pin 31 reaches between the lower portions of the side plates 24 and 25 and receives the loop on the end of the top leaf of the supplemental spring 18. If desired, washers 32 may be set on the pin 31 so as to insure satisfactory spacing of the spring loop and so as to insure that the the side plates 24 and 25 will clear the axle shaft housing, as illustrated in Fig. 3.

A pair of links 33 and 34 reach sidewise from the plates 24 and 25 at points about half way between the positions of the pins 29 and 30, as indicated in Fig. 3. These links are connected to the side plates by studs 35 and 36, respectively; and both of the links are in turn connected to the corresponding lug 16 or 17, as the case may be, by a pin such as 37.

With the spring suspension as above explained the direct down thrusts from the ends of the standard spring 10 are transmitted directly to the ends of the supplemental spring 18, and the hangers 27 and 28 allow for the necessary movements of the end portions of the standard spring as the same is deflected or straightened out. The necessary end movements of the supplemental spring 18 are taken care of by reason of the pivotal connection of the plates 24 and 25 to their respective links 33 and 34.

Said links also serve by reason of their pivotal connection with the lugs 16 and 17 to effectively prevent side sway.

It will be noted that although the entire load from the standard spring 10 is communicated in the first place to the differential housing at the middle of the rear end, nevertheless said housing is tremendously reinforced by the presence of the supplemental spring 18 and the effective connections of the same at the sides of the housing by the clips 20. Consequently, the reconstructed chassis is well able to carry all of the loads which are imposed upon it.

While I have herein shown and described only a single embodiment of the features of my present invention, still I do not intend to limit myself to the same, except as I may do so in the claims.

I claim:

1. The combination with the differential housing and the rear axle housings reaching sidewise therefrom and the transverse rear end leaf spring of a chassis, of a supplemental leaf spring having its central portion concave upwards to receive the lower portion of the differential housing and its end portions reaching sidewise below the axle shaft housings, clips at both sides of the differential housing serving to secure the leaf spring rigidly thereto at points adjacent to both sides of the differential housing, and a shackle connection at each end of the device, each shackle comprising a pair of side plates embracing the axle shaft housing between them, a cross pin joining together the side plates of each shackle at a point below the axle shaft housing and receiving the adjacent end portion of the supplemental leaf spring, another pin joining together the side plates of each shackle at a point above the axle shaft housing, a hanger reaching downwards therefrom between the side plates and above the axle shaft housing, a connection between the adjacent end of the first mentioned leaf spring and the lower portion of said hanger, and links pivotally connected to the upper portions of the side plates of each shackle and the adjacent end of the axle shaft housing, substantially as described.

2. The combination with the differential housing and the rear axle housings reaching sidewise therefrom and the transverse rear end leaf spring of a chassis, of a supplemental leaf spring having its central portion concave upwards to receive the lower portion of the differential housing and its end portions reaching sidewise below the axle shaft housings, clips at both sides of the differential housing serving to secure the leaf spring rigidly thereto at points adjacent to both sides of the differential housing, and a shackle connection at each end of the device, each shackle comprising a pair of side plates embracing the axle shaft housing between them, a cross pin joining together the side plates of each shackle at a point below the axle shaft housing and receiving the adjacent end portion of the supplemental leaf spring, another pin joining together the side plates of each shackle at a point above the axle shaft housing, a hanger reaching downwards therefrom above the axle shaft housing, a connection between the adjacent end of the first mentioned leaf spring and the lower portion of said hanger, and a link pivotally connected to the upper portion of each shackle and the adjacent end of the axle shaft housing, substantially as described.

3. The combination with the differential housing and the rear axle housings reaching sidewise therefrom and the transverse rear end leaf spring of a chassis, of a supplemental leaf spring having its central portion concave upwards to receive the lower portion of the differential housing and its end portions reaching sidewise below the axle shaft housings, clips at both sides of the differential housing serving to secure the leaf spring rigidly thereto at points adjacent to both sides of the differential housing, and a shackle connection at each end of the device, each shackle including a vertical plate connecting together the end portions of the leaf springs while permitting them to move vertically with respect to the axle shaft housing, and a link connection between said plate and the end portion of the axle shaft housing, substantially as described.

4. The combination with the differential housing and the rear axle shaft housings reaching sidewise therefrom and the transverse rear end leaf spring of a chassis, of a supplemental leaf spring located beneath the differential housing and having its end portions reaching sidewise beneath the axle shaft housings, means for securing the central portion of said supplemental leaf spring rigid with respect to the differential housing, and a shackle connection joining together the end portions of the leaf springs at both sides of the device, while allowing said springs to move vertically with respect to the axle shaft housing, and a link connection between each shackle connection and the end portion of the axle shaft housing, substantially as described.

5. The combination with one of the axles of an automotive vehicle and the transverse leaf spring thereof above said axle, of a supplemental leaf spring having its central portion secured to the central portion of the axle and its end portions reaching sidewise below the axle, together with shackles connecting together the end portions of both leaf springs, and suitable link connections between said shackles and the end portions of the axle, substantially as described.

CHARLES H. SMITH.